United States Patent Office 3,706,709
Patented Dec. 19, 1972

3,706,709
COATING COMPOSITIONS OF UNSATURATED CARBOXYLIC ACID AMIDE POLYMERS AND UNSATURATED ORGANOSILANES
J. A. Erikson, Gibsonia, Pa., and Robert G. Douds, Delaware, Ohio, assignors to PPG Industries, Pittsburgh, Pa.
No Drawing. Filed July 22, 1970, Ser. No. 57,337
Int. Cl. C08f 15/40
U.S. Cl. 260—80.71                                                11 Claims

ABSTRACT OF THE DISCLOSURE

Resinous compositions useful as coating compositions comprise an interpolymer of monomers consisting essentially of an unsaturated carboxylic acid amide, one or more ethylenically unsaturated monomers, and an unsaturated organoalkoxysilane. Coatings produced from these compositions have outstanding physical properties, such as chemical resistance, adhesion, flexibility, impact resistance, and hardness.

BACKGROUND OF THE INVENTION

This invention relates to new and improved coating compositions and, more particularly, to coating compositions in which the resinous vehicle comprises an interpolymer of an unsaturated carboxylic acid amide and an unsaturated organo alkoxysilane.

The monomeric amides used in this invention are N-alkoxyalkyl amides of the type disclosed in U.S. Pats. 3,079,434 and 3,087,965. The said N-alkoxyalkyl amides have been utilized in coating compositions, for example, they have been employed in producing a wide variety of resinous vehicles for thermosetting coating compositions having, when cured, very tough and chemical resistant characteristics.

Similarly, polymers containing polyorganosiloxanes have been employed in coating compositions to provide specific properties therein. Organosiloxane-containing resinous materials have been known for some time to produce films, which when cured have superior durability, flexibility and toughness.

DESCRIPTION OF THE INVENTION

Various methods have been used to incorporate organosiloxanes into resinous compositions and interpolymers. For example, polyorganosiloxanes have been physically blended into resinous compositions and interpolymers at room temperature. Polyorganosiloxanes such as hydroxyterminated organo-silicone resinous materials have been incorporated by condensing the polyorganosiloxanes with interpolymerized components of an alkylolated acrylamide interpolymer to form a unitary resinous composition. In some cases, organosiloxanes have reacted with unsaturated carboxylic acid amide interpolymers.

Unique methods of reacting organosiloxanes with hydroxyalkyl esters of unsaturated carboxylic acids have been known in the industry. Sometimes condensates have been formed by reacting hydroxyl-containing compounds with organosiloxanes and then reacting the said condensate with an admixture of monomeric material to produce a desired uniform siloxane-containing polymer. Also, unsaturated acid amides have been reacted with condensates of a polymerizable organoalkoxysilane and a polyorganosiloxane.

The methods of blending and condensate formation have disadvantages. For example, blending at room temperature required an extended period of time in order to incorporate the organosiloxanes and the formation of a condensate required an additional step before the intermediate could be incorporated into the interpolymer.

Initial efforts to polymerize an organoalkoxysilane with a mixture of monomers containing an unsaturated amide were unsuccessful because gelation was the usual result.

However, it has now been discovered that by exclusion of the acid monomers and employing as the unsaturated amide an unsaturated N-alkoxyalkyl amide, the aforesaid problems are avoided and ungelled interpolymers are easily obtained. Thus, N-alkoxyalkyl amides are interpolymerized with an organoalkoxysilane and at least one other ethylenically unsaturated monomer to provide solvent-soluble, heat-hardening, non-gelled interpolymers which can be incorporated into coating compositions utilized as clear or pigmented protective or decorative films. These compositions have all the advantages of the above-described organopolysiloxane-containing resinous systems, such as durability, flexibility and chemical resistance. In addition, there is no need to produce an intermediate condensate in order to incorporate the organoalkoxysilane into the interpolymer, or to utilize other similar intermediate steps.

The unsaturated carboxylic acid amide used in this invention is an N-alkoxyalkyl substituted carboxylic acid amide, preferably having the general formula:

wherein R' is an aliphatic hydrocarbon radical preferably containing from 2 to 6 carbon atoms and having a single terminal polymerizable alpha, beta-ethylenically unsaturated group, and R is a lower alkyl radical containing from 1 to 8 carbon atoms.

The preferred method for producing such amides is by reacting an unsaturated carboxylic acid amide, such as acrylamide, with formaldehyde. Preferably from about one mole to about 1.2 moles of formaldehyde per mole of acrylamide is used, and the reaction is carried out in the presence of an alkanol.

The reaction of an unsaturated carboxylic acid amide in an alkanol with formaldehyde under alkaline conditions (pH about 7.5 to 11, preferably 9 to 10) to form methylolated derivatives and subsequently without isolation, further etherifying the methylolated product with the said alkanol under acidic conditions (pH 2.7 to 7, preferably 3.5 to 4.5) in the presence of a polymerization inhibitor may be represented generally by the following reaction equations wherein acrylamide is utilized for illustrative purposes:

Step 1:

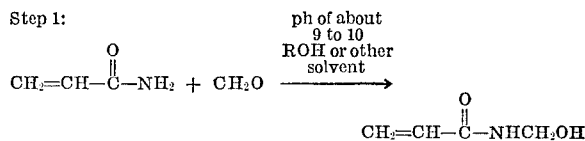

and without isolation of the product.

Step 2:

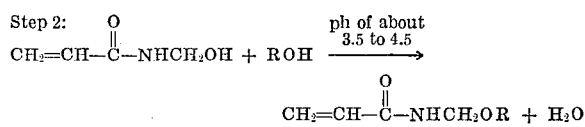

The reaction above depicted may proceed by first forming N-methylolacrylamide, which then reacts with the alcohol, with the elimination of water.

In the above equation, R represents a lower alkyl radical.

The unsaturated amide which is reacted with formaldehyde and an alkanol to produce the N-alkoxyalkyl amides employed in the present invention possesses the general structure:

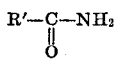

wherein R' has the significance described above. Examples of the amides that may be employed include acrylamide, methylacrylamide, alpha-cyano acrylamide, crotonamide, the mono- or diamide of itaconic acid or fumaric acid, and the like.

The preferred unsaturated amide used in this invention is N-butoxymethylacrylamide, although other N-alkoxyalkyl substituted unsaturated carboxyl acid amides such as N-methoxymethylacrylamide, N-propoxymethylacrylamide, N-isopropoxymethylacrylamide, N-isobutylmethylacrylamide, and N-butoxymethylacrylamide or the like may be employed.

The preferred silicon-containing materials employed in this invention are ethylenically unsaturated organoalkoxysilanes having the general structural formula:

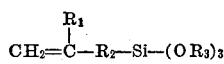

wherein $R_1$ is hydrogen or an alkyl radical; $R_2$ is a divalent organic radical; and $R_3$ is alkyl radical.

In the above formula, $R_1$ may be hydrogen or an alkyl radical of 1 to about 6 carbon atoms, such as methyl, ethyl or propyl radicals. $R_2$ is any divalent organic radical linking together the vinyl group, $CH_2=CR_1-$, and the alkoxysilane group, $-Si-(OR_3)_3$, and generally has between one and about 7 carbon atoms. A preferred radical is a carbonyloxy-containing radical as represented by the general formula:

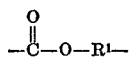

wherein $R^1$ is an alkylene radical of 1 to 6 carbon atoms, such as methylene, ethylene or propylene. $R_2$ may also be a carbonyloxy radical,

or an alkylene radical of up to about 7 carbon atoms, such as methylene, ethylene or propylene. $R_3$ includes alkyl radicals of one to about 6 carbon atoms, such as methyl, propyl or butyl radicals.

The preferred organoalkoxysilanes are those in which $R_2$ is a carboxyloxy-containing radical such as in alpha-methacryloxypropyltrimethoxysilane, alpha - acryloxypropyltrimethoxysilane and alpha-methacryloxyethyltrimethoxysilane.

The other copolymerizable monomer employed in making the interpolymer herein are essentially any copolymerizable monomer containing at least one $>C=C<$ group, but, devoid of carboxyl groups. Monomers containing carboxyl groups, i.e., unsaturated acids, should be avoided because in the past carboxyl functional monomeric materials have consistently caused premature gelation of reaction mixtures in which they have been used.

Examples of monomeric materials commonly used include vinyl aromatic hydrocarbons, such as styrene, vinyl toluene, and alpha-methyl styrene; alkyl acrylates, such as ethyl acrylate, methyl acrylates, butyl acrylate and propyl acrylate; alkyl methacrylates, such as methyl methacrylate, butyl methacrylate, and lauryl methacrylate; and unsaturated nitriles, such as acrylonitrile, methacrylonitrile and ethacrylonitrile.

Still other unsaturated monomers that can be used include various monoolefinic and diolefinic hydrocarbons, halogenated monoolefinic and diolefinic hydrocarbons, other unsaturated esters of organic and inorganic acids, and other unsaturated nitriles, and the like. For a more complete listing of these compounds, see U.S. Pats. Nos. 3,037,963 and 3,219,606.

The above component examples are used for illustrative purposes, not limitations, and should not be constructed as such.

The proportions of the components are not ordinarily critical, but it has been found that from 2 to 50 percent by weight of N-alkoxyalkyl amide produces resinous vehicles having the desired properties. For economic reasons, it is usually undesirable to include more than about 10 percent of an organoalkoxysilane, based on total weight of the monomer composition, although percentages as high as 25 percent or higher may be incorporated successfully. In some instances, percentages as low as 0.05 percent have shown improved properties. However, in ordinary practice of this invention, the resinous vehicles usually contain about 0.5 to about 10 percent of the organoalkoxysilane. The ethylenically unsaturated monomers containing at least one $>C=C<$ group and being devoid of carboxyl groups account for the remaining component of this interpolymer.

The monomers of this invention are usually mixed in an organic solvent to facilitate polymerization. The organic solvent may be a single solvent or a mixture of solvents. Butanol, preferably in admixture with an aromatic solvent, such as Solvesso 150 (boiling point 185°-200° C.) is a preferred solvent system, but the invention is not limited to the specific named solvents since many other solvents are available and useful, such as toluene, methyl ethyl ketone, methyl isobutyl ketone, acetone, butyl acetate, 2-ethoxy ethanol, 2-butoxyethanol, and the like.

In addition to the essential components, other resins may be utilized in combination with the said interpolymer resin, such as vinyl chloride polymers; the alkyd resins, both oil-modified and non-oil modified; epoxidized oils, that is, epoxidized fatty acid esters, preferably containing at least 8 carbon atoms; amide resins, such as urea-formaldehyde resins and melamine-formaldehyde resins; nitrocellulose resins; hydrocarbon resins, such as polyethylene and polypropylene; phenolic resins; as well as any other resinous materials compatible with the amide interpolymer resin.

When the resinous interpolymer and blends described above are utilized in forming coating compositions, pigments, such as titanium dioxide, carbon black, talc, barytes, zinc sulfate, strontium chromate, barium chromate, ferric iron oxide, as well as color pigments, such as cadmium yellow, cadmium red, toluidine red, phthalocyanine blue, and the like may be added to form any desired color and to enhance the film properties. The coating compositions are produced by blending the resinous vehicle and desired pigment composition and grinding in accordance with well-known practice.

The coating compositions so produced can be applied by ordinary methods of application, for example, by reverse roll coat, spraying, and dipping or by similar conventional techniques, and then baked to form a hard, tough adherent film. Typical baking schedules include 30 minutes at 300° F. to one minute at 500° F.

The mechanical apparatus utilized in the manufacture of the resinous interpolymer consists of that commonly known in the art. Generally, the ingredients are admixed and charged into a reaction vessel equipped with a continuously operating electrical or air-operated stirrer, a thermometer; a heating jacket or mantel; and a distilling column.

In carrying out the polymerization reaction, a peroxygen type catalyst is ordinarily utilized. Useful catalysts for this purpose include acetyl benzoyl peroxide, cyclohexyl hydroperoxide, cumene hydroperoxide, acetyl peroxide, lauryl peroxide, di-t-butyl peroxide, methyl ethyl ketone peroxide, di-t-butyl diperphthalate and the like. Azo compounds such as p-methoxyphenyl diazothio(2-naphthyl) ether and alpha, alpha'-azobisisobutyronitrile, may also be used. The quantity employed may vary considerably, however, in most instances it is desirable to utilize from about 0.1 to about 2.0 percent by weight, based upon the monomeric components.

In many instances, it is also desirable to add a chain transfer or "short-stopping" agent to the polymerization mixture. Mercaptans are conventionally used for this purpose, but other chain modifying agents, such as cyclopentadiene, allyl carbamate, alpha methyl styrene and the like can also be used to secure low molecular weights, as can unsaturated fatty esters.

Set forth below are several examples to illustrate the nature and properties of the coating compositions of this invention. The invention, however, should not be considered to be limited to these details. All parts and percentages are by weight.

EXAMPLE I

Two monomer solutions were prepared as follows.

| Solution A: | Parts by weight |
|---|---|
| N - butoxymethylacrylamide (61.5 percent solids in 3 parts n-butanol and 1 part xylene) | 540.0 |
| Methacrylonitrile | 300.0 |
| Butyl acrylate | 637.0 |
| Styrene | 412.5 |
| Alpha-methacryloxypropyltrimethoxysilane | 80.0 |
| Alpha, alpha'-azobisisobutyronitrile | 8.0 |

| Solution B: | |
|---|---|
| Alpha, alpha'-azobisisobutyronitrile | 18.4 |
| n-Butanol | 100.0 |
| Solvesso-150 (high boiling aromatic solvent boiling point 185° C.–200° C.) | 720.0 |

A reaction vessel was charged with 276 parts of n-butanol and 154 parts of Solvesso 150 and this mixture was heated to reflux.

Solution A was added over a 3-hour period while keeping the temperature at refluxing conditions, then Solution B was similarly added over a four-hour period. The reaction was allowed to continue for an additional hour. A total of 176.0 parts of solvent were collected by azeotropic distillation. On cooling, 300.0 parts of Solvesso 150 were added.

The resin solution obtained had the following characteristics:

| | |
|---|---|
| Non-volatile solids content (percent) | 46.7 |
| Viscosity (Gardner-Holdt) | V–W |
| Color (Gardner) | 1+ |
| Acid number | 0.24 |

EXAMPLE II

A reaction vessel was charged and two solutions were made up as follows.

| Charge: | Parts by weight |
|---|---|
| N-butoxymethylacrylamide (as in Example I) | 270.0 |
| Methacrylonitrile | 150.0 |
| Butyl acrylate | 318.8 |
| Styrene | 206.3 |
| Alpha-methacryloxypropyltrimethoxysilane | 40.0 |
| n-Butanol | 280.0 |
| Solvesso 150 | 210.0 |
| Alpha, alpha'-azobisisobutyronitrile | 2.0 |

| Solution A: | |
|---|---|
| N-butoxymethylacrylamide (as in Example I) | 270.0 |
| Methacrylonitrile | 150.0 |
| Butyl acrylate | 318.8 |
| Styrene | 206.3 |
| Alpha-methacryloxypropyltrimethoxysilane | 40.0 |
| Alpha, alpha'-azobisisobutyronitrile | 10.4 |

| Solution B: | |
|---|---|
| Alpha, alpha'-azobisisobutyronitrile | 14.0 |
| n-Butanol | 50.0 |
| Solvesso 150 | 620.0 |

The contents of the reaction vessel were heated to refluxing conditions (113° C.), then Solution A was added over a two-hour period, followed by the addition of Solution B over a three-hour period. After holding the reaction at refluxing conditions, a mixture of 40.5 parts Solvesso 150 and 121.5 parts of n-butanol were added. After azeotropic distillation and collection of 162.0 parts solvent, the product was permitted to cool and an additional 250.0 parts of Solvesso 150 were added to the vessel.

The resin solution produced the following characteristics:

| | |
|---|---|
| Non-volatile solids content (percent) | 51.8 |
| Viscosity (Gardner-Holdt) | Y+ |
| Color (Gardner) | 1.25 |
| Acid number | 2.0 |

EXAMPLE III

| Solution A: | Parts by weight |
|---|---|
| N-butoxymethylacrylamide (as in Example I) | 270.0 |
| Alpha-methacryloxypropyltrimethoxysilane | 52.5 |
| Methacrylonitrile | 300.0 |
| Butyl acrylate | 472.0 |
| Ethyl acrylate | 600.0 |
| Tertiary dodecyl mercaptan | 5.0 |
| Alpha, alpha'-azobisisobutyronitrile | 10.0 |
| n-Butanol | 100.0 |

| Solution B: | |
|---|---|
| Alpha, alpha'-azobisisobutyronitrile | 13.9 |
| n-Butanol | 50.0 |
| Solvesso 150 | 540.0 |

In a reaction vessel, 600.0 parts of Solution A were heated to reflux (100° C.) and the remaining portion of Solution A was added to the refluxing reaction mixture over a two-hour period. Then Solution B was added over a three-hour period and upon the completion of the addition of Solution B, the reaction was permitted to continue for one hour. After cooling, 555 parts of Solvesso 150 and 100.0 parts of n-butanol were added.

The resin solution produced the following characteristics:

| | |
|---|---|
| Non-volatile solids content (percent) | 50.3 |
| Viscosity (Gardner-Holdt) | W–X |
| Color (Gardner) | 1– |
| Acid number | 0.21 |

EXAMPLE IV

| Solution A: | Parts by weight |
|---|---|
| N-butoxymethylacrylamide (as in Example I) | 270.0 |
| Alpha-methacryloxypropyltrimethoxysilane | 30.0 |
| Methacrylonitrile | 300.0 |
| Butyl acrylate | 472.0 |
| Ethylacrylate | 622.5 |
| Tertiary dodecyl mercaptan | 5.0 |
| Alpha, alpha'-azobisisobutyronitrile | 10.0 |
| n-Butanol | 100.0 |

| Solution B: | |
|---|---|
| Alpha, alpha'-azobisisobutyronitrile | 13.9 |
| n-Butanol | 50.0 |
| Solvesso 150 | 540.0 |

In a reaction vessel, 600.0 parts of Solution A were heated to reflux (96° C.) and the remaining portion of Solution A was added to the refluxing reaction over a two-hour period. Then Solution B was added over a three-hour period, and upon the completion of the addition of Solution B, the reaction was allowed to continue for one hour. After cooling, 555.0 parts of Solvesso 150 and 100.0 parts of n-butanol were added. A total of 2.3 parts of water were azeotropically distilled off.

The resin solution produced had the following characteristics:

Non-volatile solids content (percent) _____ 56.6
Viscosity (Gardner-Holdt) _____ W+
Color (Gardner) _____ 1—
Acid number _____ 0.5

EXAMPLE V

Following the procedure of Example IV, an interpolymer was produced from the following.

Solution A: Parts by weight
  N-butoxymethylacrylamide (as in Example I) _____ 270.0
  Alpha - methyl acryloxypropyltrimethoxysilane _____ 15.0
  Methacrylonitrile _____ 300.0
  Butyl acrylate _____ 472.0
  Ethyl acrylate _____ 637.5
  Tertiary dodecyl mercaptan _____ 5.0
  Alpha, alpha'-azobisisobutyronitrile _____ 10.0
  n-Butanol _____ 100.0
Solution B:
  Alpha, alpha'-azobisisobutyronitrile _____ 13.9
  n-Butanol _____ 50.0
  Solvesso 150 _____ 246.0

The resin solution produced had the following characteristics:

Non-volatile solids constant (percent) _____ 50.9
Viscosity (Gardner-Holdt) _____ W+
Color (Gardner) _____ 1—
Acid number _____ 0.29

EXAMPLE VI

Following the procedure of Example II, an interpolymer was produced from the following.

Charge: Parts by weight
  N - butoxymethylacrylamide (as in Example I) _____ 270.0
  Methyl methacrylate _____ 150.0
  Styrene _____ 525.0
  Alpha-methacryloxypropyltrimethoxysilane __ 40.0
  n-Butanol _____ 280.0
  Xylene _____ 210.0
  Alpha, alpha'-azobisisobutyronitrile _____ 2.0
Solution A:
  N-butoxymethyl acrylamide _____ 270.0
  Methyl methacrylate _____ 150.0
  Styrene _____ 525.0
  Alpha-methacryloxypropyltrimethoxysilane __ 40.0
  Alpha, alpha'-azobisisobutyronitrile _____ 10.4
Solution B:
  Alpha, alpha'-azobisisobtuyronitrile _____ 14.0
  Toluene _____ 70.0

The solvent addition, upon completion, consisted of 250.0 parts of Solvesso 150. A total of 3.0 parts of water were azeotropically distilled off. The resin solution produced had the following characteristics:

Non-volatile solids content (percent) _____ 52.8
Viscosity (Gardner-Holdt) _____ Z-1+
Color (Gardner) _____ 1+
Acid number _____ 0.5

The vehicles produced in the examples were utilized in making coating compositions employing various conventional pigments. For example, a typical composition was made as follows: (a) 100.0 parts of a pebble mill paste consisting essentially of the interpolymer of Example I and titanium dioxide at a pigment-to-binder ratio of 0.6 to 1.0; (b) 146.0 parts of the interpolymer of Example I; (c) 20.0 parts of Solvesso 150; (d) 10.0 parts n-butanol and (e) 4.5 parts of a pigment paste consisting essentially of the interpolymer of Example I, phthalocyanine blue (12 percent based on total weight solids), china clay, dispersing agent (ethoxylated alkylphenol phosphate), dimethylethanolamine and deionized water. The above paste was ground in a pebble mill to a minimum reading of 6 on a Hegman grind gauge.

The above composition was applied to an aluminum sheet as a 1.0 mil dry film when baked for 90 seconds at 500° F. The coating produced the following characteristics:

Pencil hardness (Eagle Turquoise) _ H.
Bend (180°) _____ No cracking visible.
Reverse impact resistance (inch pounds) _____ 20—no cracking.
Outdoor horizontal exposure results (60° gloss meter) _____ Initial gloss 88; after 26 months, gloss 26.
Accelerated weathering test Weather-O-Meter results, measured with 85° gloss meter _____ Initial gloss 94; after 2576 hours, gloss 74.

The coating compositions of this invention have excellent adhesion. For example, the adhesion of the resin in Example I was compared with that of a composition with the same monomer ratios, except for the omission of alpha-methacryloxypropyltrimethoxysilane. Both compositions were evaluated as a clear composition on aluminum and tinplate. The cure schedule was 30 minutes at 212° F. and 90 minutes at 250° F. Adhesion was evaluated by cutting through the cured film with a pointed metal scribe to make a series of parallel scribe lines about ⅛ inch apart, perpendicularly intersected by another series of parallel scribe lines about ⅛ inch apart. A strong, bonded adhesive tape is firmly applied over the area comprising the ⅛ inch square sections, and the tape is removed from the film by one fast, continuous motion. After visual inspection, the taped area of the coating was rated on a scale of 0 to 10, 0 being perfect and 10 complete removal of the film from the applied surface.

The results are shown below:

| Composition | Baked 30 min. at 212° F. | | Baked 90 min. at 250° F. | |
|---|---|---|---|---|
| | Aluminum | Tinplate | Aluminum | Tinplate |
| Example I | 1.1 | 1.1 | 1.9 | 1.4 |
| Control | 2.9 | 3.0 | 9.2 | 3.6 |

The values recorded above were each the average of at least nine independent evaluations.

Similar results to those shown are obtained using other interpolymers of the class described in place of those in the foregoing examples. For example, N-propoxymethylacrylamide can be employed instead of N-butoxymethylacrylamide. Also, alpha-acryloxypropyltrimethoxysilane can be used instead of alpha-methacryloxypropyltrimethoxysilane wtih results that are satisfactory for many purposes. Other materials, such as the resinous products mentioned hereinabove, can be added in such ratios as to produce a resinous solution with properties desired. If desired, the coating compositions herein can be applied over a primer coating.

According to the provisions of the patent statutes, there are disclosed above the invention and what are now considered to be its best embodiments. However, it is to be understood that, within the scope of the appended claims, the invention may be practiced otherwise than as specifically described.

We claim:
1. A solvent-soluble, heat-hardening, non-gelled addition interpolymer of monomers consisting essentially of:
  (a) from about 2 to about 50 percent, based on weight of interpolymer, of an N-alkoxyalkyl substituted un- saturated carboxylic acid amide having the general formula:

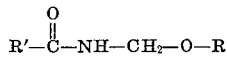

wherein R' is an aliphatic hydrocarbon radical containing from 2 to 6 carbon atoms and having a single terminal polymerizable alpha, beta-ethylenically unsaturated group, and R is a lower alkyl radical containing from 1 to 8 carbon atoms;

(b) at least one other copolymerizable ethylenically unsaturated monomer which contains a $>C=C<$ group and is devoid of carboxyl groups; and (c) at least 0.05 percent, based on weight of interpolymer of a copolymerizable ethylenically unsaturated organoalkoxysilane having the general formula:

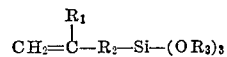

wherein $R_1$ is a hydrogen or an alkyl radical of 1 to about 6 carbon atoms; $R_2$ is a member selected from the group consisting of alkylene radicals of 1 to 7 carbon atoms and carbonyloxy-containing radicals represented by the formula:

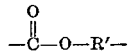

wherein R' is an alkylene radical of 1 to 6 carbon atoms and linking together the vinyl group, $$CH_2=CR_1—$$

and the alkoxysilane group, $—Si—(OR_3)_3$, and $R_3$ is an alkyl radical of 1 to about 6 carbon atoms.

2. The interpolymer of claim 1 in which said ethylenically unsaturated monomer is selected from the group consisting of: (a) vinyl aromatic hydrocarbons, (b) alkyl acrylates, (c) alkyl methacrylates, and (d) mono-unsaturated organic nitriles.

3. The resinous interpolymer of claim 1 in which said ethylenically unsaturated organoalkoxysilane is alpha-methacryloxypropyltrimethoxysilane.

4. The interpolymer of claim 2 in which the vinyl aromatic hydrocarbon is selected from a member of the class consisting of styrene, vinyl toluene and alpha methyl styrene.

5. The interpolymer of claim 2 in which the alkyl acrylate is selected from a member of the class consisting of ethyl acrylate, methyl acrylate, butyl acrylate and propyl acrylate.

6. The interpolymer of claim 2 in which the alkyl methacrylate is selected from a member of the class consisting of methyl methacrylate, butyl methacrylate, and lauryl methacrylate.

7. The interpolymer of claim 2 in which the unsaturated organic nitrile is selected from a member of the class consisting of acrylonitrile, methacrylonitrile and ethacrylonitrile.

8. A coating composition comprising an addition interpolymer of monomers consisting essentially of:

(a) from about 2 to about 50 percent based on weight of interpolymer of an N-alkoxyalkyl substituted unsaturated carboxylic acid amide having the general formula:

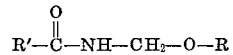

wherein R' is an aliphatic hydrocarbon radical containing from 2 to 6 carbon atoms and having a single terminal polymerizable alpha, beta-ethylenically unsaturated group, and R is a lower alkyl radical containing from 1 to 8 carbon atoms;

(b) at least one other copolymerizable ethylenically unsaturated monomer which contains a $>C=C<$ group and is devoid of carboxyl groups; and (c) at least 0.05 percent based on weight of interpolymer of copolymerizable ethylenically unsaturated organoalkoxysilane having the general formula:

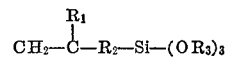

wherein $R_1$ is a hydrogen or an alkyl radical of 1 to about 6 carbon atoms; $R_2$ is a member selected from the group consisting of alkylene radicals of 1 to 7 carbon atoms and carbonyloxy-containing radicals represented by the formula:

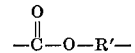

wherein R' is an alkylene radical of 1 to 6 carbon atoms and linking together the vinyl group, $$CH_2=CR_1—$$

and the alkoxysilane group, $—Si—(OR_3)_3$, and $R_3$ is an alkyl radical of 1 to about 6 carbon atoms.

9. A coating composition as in claim 8 in which said ethylenically unsaturated monomer is selected from the group consisting of: (a) vinyl aromatic hydrocarbons, (b) alkyl acrylates, (c) alkyl methacrylates, and (d) mono-unsaturated organic nitriles.

10. A coating composition as in claim 8 in which said ethylenically unsaturated organoalkoxysilane is alpha-methacryloxypropyltrimethoxysilane.

11. An article of manufacture comprising a substrate having thereon a coating composition as described in claim 8.

References Cited

UNITED STATES PATENTS

| | | | |
|---|---|---|---|
| 3,203,919 | 8/1965 | Brachman | 260—29.6 |
| 3,261,881 | 7/1966 | Christenson et al. | 260—826 |
| 3,318,971 | 5/1967 | Chlouper et al. | 260—826 |
| 3,417,161 | 12/1968 | Douds et al. | 260—825 |
| 3,467,634 | 9/1969 | Jacknow et al. | 260—80.71 |

JAMES A. SEIDLECK, Primary Examiner

S. M. LEVIN, Assistant Examiner

U.S. Cl. X.R.

260—33.6 UD, 41 B, 41 C, 41 R, 827, 17, 33.4; 117—132 R